United States Patent
Vicentini et al.

(10) Patent No.: US 8,621,984 B2
(45) Date of Patent: Jan. 7, 2014

(54) MACHINE FOR PREPARING BEVERAGES BY INFUSION OF A PRODUCT CONTAINED IN A CAPSULE OR THE LIKE

(75) Inventors: Vittorio Vicentini, Fraz. Revigliasco di Moncalieri (IT); Stefano Tornincasa, Sant'Ambrogio di Torino (IT); Elvio Bonisoli, Turin (IT); Alfredo Vanni, Magliolo (IT)

(73) Assignee: Luigi Lavazza S.p.A., Turin (IT)

( * ) Notice: Subject to any disclaimer, the term of this patent is extended or adjusted under 35 U.S.C. 154(b) by 312 days.

(21) Appl. No.: 13/130,668

(22) PCT Filed: Jul. 30, 2010

(86) PCT No.: PCT/IB2010/053470
§ 371 (c)(1),
(2), (4) Date: May 23, 2011

(87) PCT Pub. No.: WO2011/015978
PCT Pub. Date: Feb. 10, 2011

(65) Prior Publication Data
US 2011/0226132 A1    Sep. 22, 2011

(30) Foreign Application Priority Data
Aug. 3, 2009 (IT) ............................... TO2009A0603

(51) Int. Cl.
*A47J 31/06* (2006.01)

(52) U.S. Cl.
USPC .......... 99/295; 99/289 R; 99/302 P; 99/302 R (58) Field of Classification Search
USPC ................. 99/295, 289 R, 302 R, 302 P, 279; 426/77, 433
See application file for complete search history.

(56) References Cited

U.S. PATENT DOCUMENTS

| 4,188,863 A | * | 2/1980 | Grossi ............................. 99/286 |
| 4,681,028 A |   | 7/1987 | Schmed et al. |
| 5,259,296 A | * | 11/1993 | Mikael et al. ................... 99/280 |
| 7,024,985 B2 | * | 4/2006 | Park ............................. 99/302 P |

FOREIGN PATENT DOCUMENTS

| EP | 1 854 384 A1 | 11/2007 |
| WO | 2007/110842 A3 | 10/2007 |

OTHER PUBLICATIONS

International Search Report PCT/IB2010/053470, Jan. 26, 2011.

* cited by examiner

*Primary Examiner* — Henry Yuen
*Assistant Examiner* — John Wasaff
(74) *Attorney, Agent, or Firm* — Sughrue Mion, PLLC (57) ABSTRACT

A machine having a support structure with a hot-water dispensing head, a capsule-carrying assembly which is mounted so as to be movable in a first plane in the support structure. The machine further including a guide means suitable for allowing the capsule-carrying assembly to move between a working position in which the assembly is coupled with the dispensing head and an intermediate position in which the assembly can pivot about a first axis perpendicular to the first plane, towards an angular loading position in which it can receive a capsule. The machine also having an actuating device which includes an actuator member which is rotatable about a second fixed axis and can bring about the movement thereof between the working position and the loading position.

5 Claims, 7 Drawing Sheets

MACHINE FOR PREPARING BEVERAGES BY INFUSION OF A PRODUCT CONTAINED IN A CAPSULE OR THE LIKE

CROSS REFERENCE TO RELATED APPLICATIONS

This application is a National Stage of International Application No. PCT/IB2010/053470 filed Jul. 30, 2010, claiming priority based on Italian Patent Application No. TO2009A000603 filed Aug. 3, 2009, the contents of all of which are incorporated herein by reference in their entirety.

BACKGROUND OF THE INVENTION

The present invention relates to machines for preparing beverages, in particular coffee, by the infusion of a product contained in a capsule or the like.

In the present description and in the appended claims, the term "capsule" means, in general, a package containing a portion of a product, for example, ground roast coffee, suitable for the preparation of a beverage by infusion or percolation.

In this sense, the term "capsule" therefore also means, for example, a so-called filter-paper "pod" or the like.

Previous European patent application EP-1 854 384 A1 describes and illustrates a beverage-preparing machine in which the movement of the capsule-carrying assembly can be controlled by means of an actuator member which is rotatable about an oblique axis parallel to or even coplanar with the plane of movement of the body.

The actuator member has a transverse arm provided with a revolving end roller which is engaged with predetermined clearance in a channel-shaped rolling guide provided in the capsule-carrying assembly. The arrangement is such that, starting from the loading position, a rotation of the actuator member can bring about tilting of the capsule-carrying assembly from a substantially vertical arrangement to an arrangement in which it is inclined and aligned with the hot-water dispensing head. Further rotation of the actuator member can then bring about the translation of the capsule-carrying assembly towards the dispensing head.

To permit both the initial tilting of the capsule-carrying assembly and then its upward translation, the revolving roller of the arm of the actuator member has to be engaged in the associated rolling guide of the capsule-carrying assembly with predetermined clearance. Moreover, to bring about the tilting of the capsule-carrying assembly away from or towards the loading position, the revolving roller has to interact in an oblique direction with one or other of the facing walls or sides of the rolling guide of the capsule-carrying assembly.

In the solution according to EP 1 854 384 A1, the forces that are applied to the revolving roller during the movement of the capsule-carrying assembly are slight whereas they become much greater during the pressing of the capsule-carrying assembly against the dispensing head. This results in a need to over-dimension the bearing associated with the revolving roller.

Moreover, in the solution according to EP 1 854 384, the angle between the working (dispensing) position and the loading position (for the loading of a capsule into the capsule-carrying assembly) is in fact limited: in practice, in the loading position, the capsule-carrying assembly is arranged substantially vertically whereas it would be more convenient for the user if the seat for housing the capsule were directed angularly towards the user.

A further limitation of the solution according to application EP 1 854 384 A1 lies in the fact that the handle for operating the actuator member or rotary shaft has to be gripped and rotated by the user from the front, which is not optimal from the ergonomic point of view.

During the pivoting of the capsule-carrying assembly, the revolving roller also has to interact with the rolling guide in an oblique direction.

In another beverage-preparing machine known from U.S. Pat. No. 4,681,028, a capsule-carrying assembly is mounted so as to be movable between a working position in which it is coupled with the dispensing head and an intermediate position in which the assembly can pivot about an axis towards an angular loading position in which it can receive a capsule.

The kinematic mechanism for actuating the capsule-carrying assembly is not described in detail in this United States patent but seems in any case quite complex.

A further beverage-preparing machine is also known, in which a capsule-carrying assembly is movable between a working position in which it is coupled with the dispensing head and an intermediate position in which the assembly can pivot towards an angular loading position to receive a capsule. In this machine, the kinematic actuating mechanism comprises a rotatable system of levers to which a sliding block is articulated; the sliding block is engaged with a prismatic fit in a corresponding sliding guide of the capsule-carrying assembly. The arrangement is such that the sliding block is permanently engaged in the corresponding guide of the capsule-carrying assembly, even when the assembly is urged towards and against the hot-water dispensing head.

BRIEF SUMMARY OF THE INVENTION

An objective of the present invention is to provide an improved beverage-preparing machine which can overcome the disadvantages and the limitations of the machines according to the prior art.

This and other objectives are achieved, according to the invention, by a machine the main features of which are defined in the claims.

In a machine produced in accordance with the present invention, the actuating means comprise at least one arm which is rotatable about an axis perpendicular to the plane of movement of the capsule-carrying assembly. The at least one arm is provided with a revolving roller which is engaged in a corresponding rolling guide of the capsule-carrying assembly, and which is arranged in a plane parallel to the plane of movement of the said assembly.

In a machine according to the invention, the arrangement is such that, when the capsule-carrying assembly is between the loading position and an intermediate position, the movement of the assembly is controlled by means of the revolving roller and the corresponding guide of the capsule-carrying assembly and, when the capsule-carrying assembly is in a position between the intermediate position and the working position (the dispensing position), the revolving roller of the at least one arm can disengage from the corresponding guide and the arm is then coupled directly with the capsule-carrying assembly so that the latter can be urged towards and pressed against the dispensing head directly by the arm.

In a machine according to the invention, the arrangement is such that the angle between the dispensing position and the loading position is clearly larger than in the machine according to EP 1 854 384 A1 and, in the loading position, the capsule-carrying assembly can advantageously be inclined towards the user, permitting easier insertion of a capsule.

Moreover, for a manually-operated machine, the rotation of the actuator member can be brought about by means of a handle rotatable about a horizontal axis perpendicular to the plane of movement of the capsule-carrying assembly. This therefore allows such a handle to be arranged on a side of the machine, for example, the right-hand side and its operation is ergonomically easier. Alternatively, the actuation member may be rotated by means of a conventional U-shaped handle, likewise rotatable about a horizontal axis towards or away from the user and hence in an ergonomically quite convenient manner.

In a machine according to the invention, the tilting of the capsule-carrying assembly away from or towards the loading position does not involve an interaction in an oblique direction between the roller and the walls of the associated guide.

The kinematic actuating mechanism of the capsule-carrying assembly of a machine according to the present invention is also structurally simpler than that described in U.S. Pat. No. 4,681,028.

Finally, in comparison with the above-mentioned known machine, the use of a revolving roller in place of a sliding block with a prismatic fit in an associated guide leads to a reduction in friction and easier operation.

By virtue of the fact that, in the machine according to the invention, the revolving roller of the at least one control arm disengages from the associated guide during the final stage of the travel towards the dispensing head, the rotation bearing associated with the roller can be dimensioned for low stresses and the force necessary for reliable, leaktight closure of the capsule-carrying assembly against the dispensing head is ensured by the direct coupling between the at least one control arm and the capsule-carrying assembly.

BRIEF DESCRIPTION OF SEVERAL VIEWS OF THE DRAWINGS

Further features and advantages of the invention will become clear from the detailed description which follows with reference to the appended drawings, in which.

BRIEF DESCRIPTION OF THE INVENTION

A beverage-preparing machine according to the present invention is generally indicated 1 in the drawings.

Figure 1:
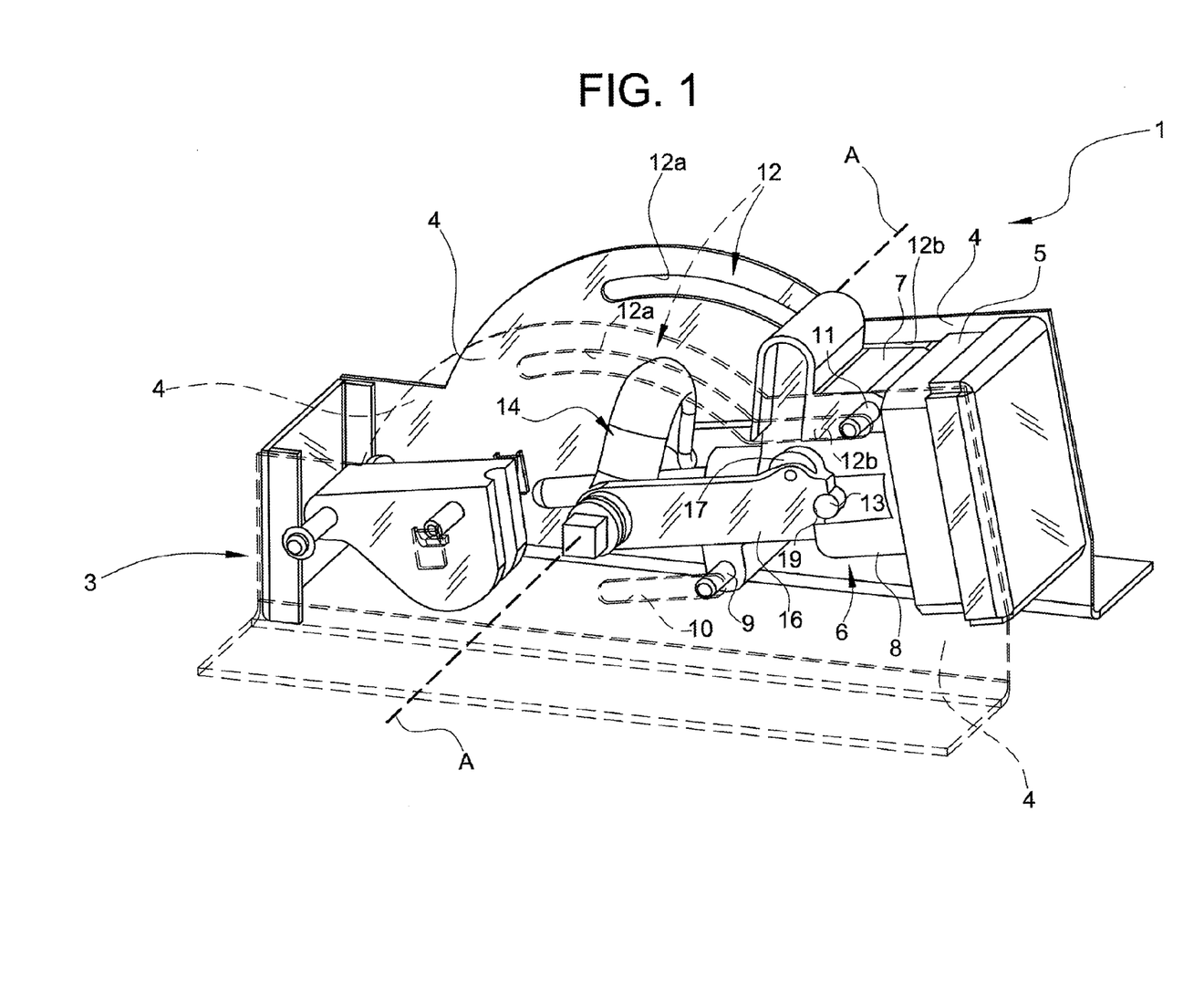
FIG. 1 is a perspective view of a first machine according to the invention.

In the embodiment shown by way of example in FIG. 1, the machine 1 comprises a support structure, generally indicated 3. The structure comprises two shaped plates 4 which extend facing one another in respective, substantially parallel, vertical planes.

To enable the kinematic mechanisms of the machine 1 to be seen, the shaped plate 4 that is closer to the observer has been shown in broken outline in FIG. 1.

A hot-water dispensing head of known type, generally indicated 5, is mounted in a fixed position between a pair of homologous ends of the plates 4. In the embodiment shown, the dispensing head 5 is mounted in an attitude in which it is inclined to the vertical but this arrangement is not essential.

Again in known manner, the head 5 is connected to a heater device, not shown, such as a boiler or heat exchanger.

The machine 1 further comprises a capsule-carrying assembly 6 mounted so as to be movable in the support structure 3. In the embodiment shown, this assembly comprises basically a main body 7 (see FIG. 3 in particular) with a cup-shaped portion 8 suitable for housing a capsule containing a product for the preparation of a beverage.

Figure 3:
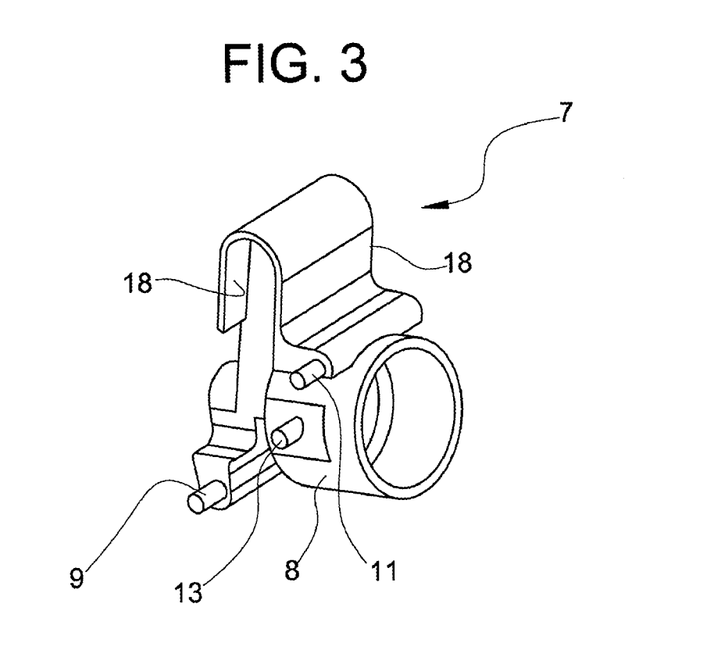
FIG. 3 is a perspective view of part of a capsule-carrying assembly for the machine according to FIG. 1.

The body 7 has, on its sides facing the plates 4, two first, horizontally-aligned appendages or pins 9 facing in opposite directions. The pins 9 extend through respective guide slots 10 which are formed in the plates 4 and extend in oblique, parallel directions substantially perpendicular to the plane in which the dispensing head 5 lies.

The body 7 also has a further pair of transversely projecting appendages 11 for cooperating with two adjacent portions 12a, 12b of two slots 12 formed in facing positions in the plates 4.

The portions or sections 12a of the slots 12 extend as arcs of circles having their respective centres at the lower ends of the slots 10 and are connected to the portions or sections 12b which, on the other hand, are linear and substantially parallel to the slots 10.

In the embodiments illustrated by way of example in the drawings, the machine 1 is of the manually operated type and comprises basically a shaft 14 (see FIG. 2 in particular) which extends between the plates 4 and is rotatable about an axis A-A perpendicular to those plates. The axis A-A is advantageously horizontal.

Figure 2:
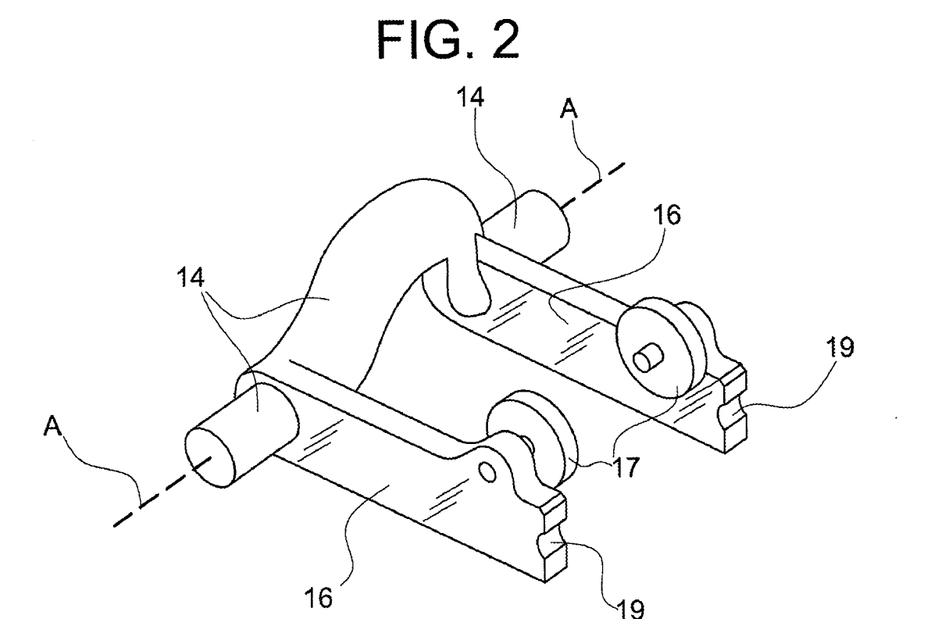
FIG. 2 is a perspective view of an actuating assembly included in the machine according to FIG. 1.

An operating grip or handle (not shown) may be connected laterally to an end of the shaft 14 which extends out of the structure 3.

Two substantially transverse arms 16 are fixed to the ends of the shaft 14 in the region disposed between the plates 4; respective, substantially cylindrical revolving rollers 17 are connected rotatably to the distal ends of the arms 16 (see FIG. 2 in particular).

The revolving rollers 17 can extend inside respective rolling guides 18 constructed, for example, in the form of channels in two opposed lateral surfaces of the body 7 of the capsule-carrying assembly 6. The transverse width of the channels 18, that is, the distance between their facing walls or sides, corresponds to the diameter of the associated revolving rollers 17.

An operating cycle of the machine 1 of FIGS. 1 to 7 will now be described with particular reference to the series of FIGS. 4 to 7.

Figures 4, 5:
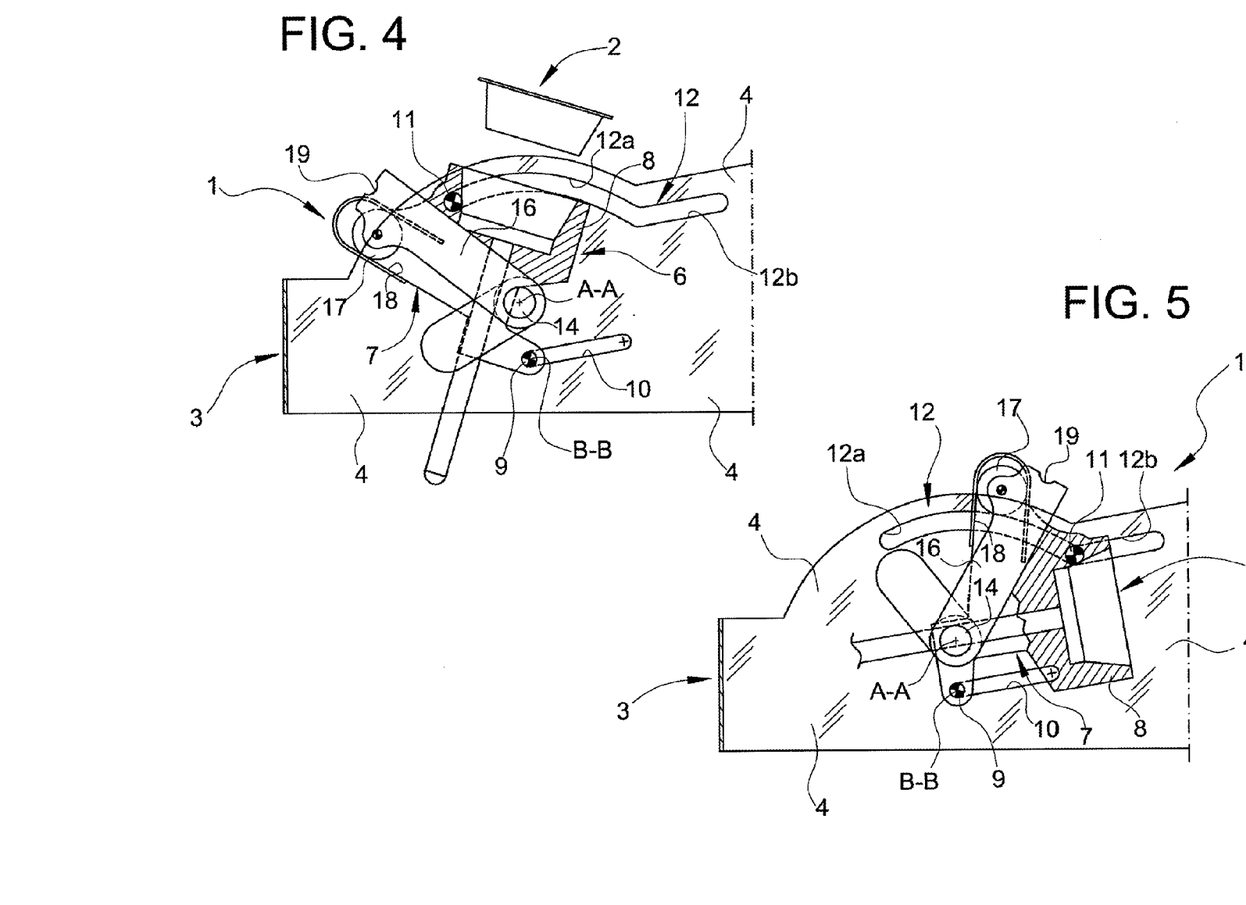
FIGS. 4 to 7 are partial side views which show the machine of FIG. 1 in four different operative conditions.

It is assumed initially that the machine 1 is in the condition shown in FIG. 4. In this condition, the capsule-carrying assembly 6 is arranged in an angular loading position in which it can receive a capsule 2 of beverage-preparation product. In this condition, the pins 9 of the body 7 bear on the lower ends of the respective guide slots 10 of the plates 4. The projecting appendages or pins 11 bear on the ends (the left-hand ends as seen in FIG. 4) of the portions 12a of the guide slots 12.

Starting from the loading position of FIG. 4, the attitude of the capsule-carrying assembly 6 is changed by means of a rotation of the shaft 14 about the axis A-A (clockwise as seen in that drawing) until the arrangement shown in FIG. 5 is reached. In effect, the rotation of the shaft 14 from the condition of FIG. 4 brings about a rotation of the capsule-carrying assembly 6 about the axis of the pins 9, which is indicated as axis B-B in FIGS. 4 and 5, until the projecting appendages 11 reach the connecting region between the arcuate portions 12a and the adjacent ascending straight portions 12b of the slots 12. In this condition (FIG. 5) the capsule-carrying assembly is axially aligned with the dispensing head 5 but is still spaced therefrom. During the movement between the loading position shown in FIG. 4 and the intermediate position shown in FIG. 5, the movement is transmitted to the capsule-carrying assembly 6 by means of the arms 16, the associated revolving rollers 17, and the walls of the associated guides 18.

Figures 6, 7:
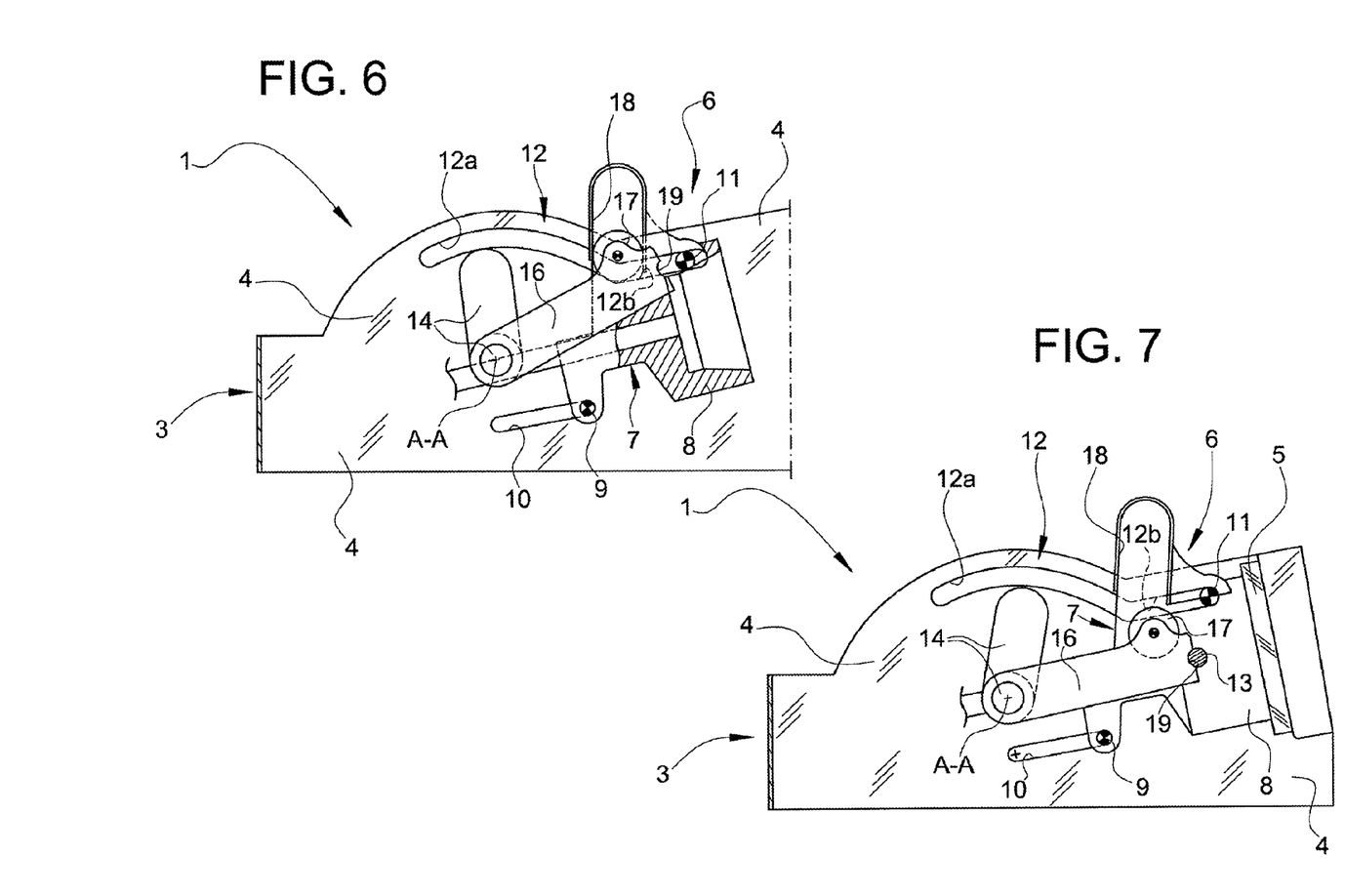
Figure 8:
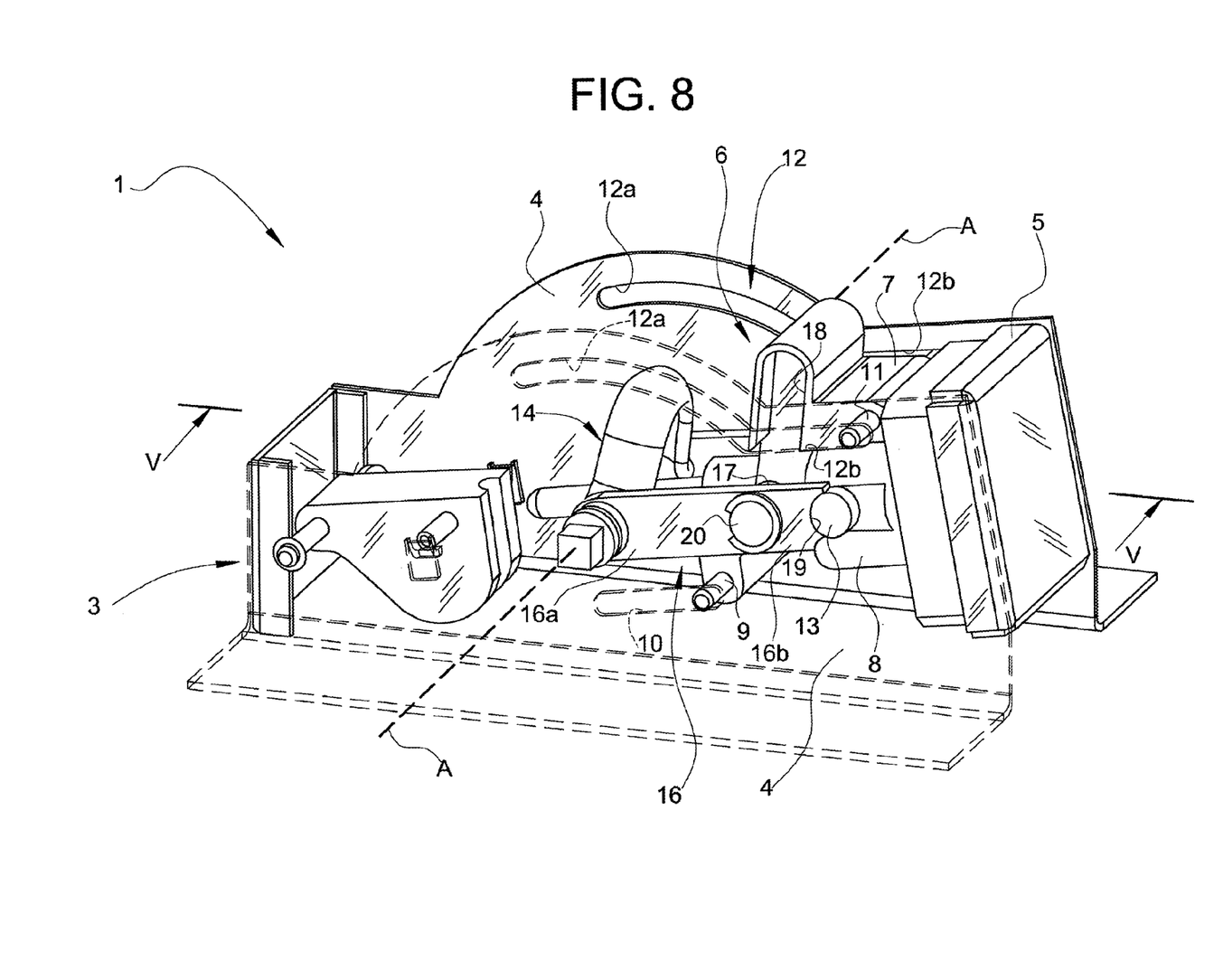
FIG. 8 is a perspective view of a variant of the machine according to the invention.

Further rotation of the shaft 14, still clockwise as seen in FIGS. 5 and 6, brings about translation of the capsule-carrying assembly 6 towards the dispensing head 5 as a result of the interaction between the revolving rollers 17 and the associated rolling guides 18, this translation being guided by the sliding of the pins 9, 11 in the associated guide slots 10, 12.

Between the position shown in FIG. 6 and the final working position of FIG. 7, the revolving roller 17 of each of the arms 16 can disengage from the corresponding guide 18 and the distal ends of the associated arms 16 are coupled directly with respective transverse appendages 13 of the body 7 of the capsule-carrying assembly 6 (see FIGS. 1, 3 and 7 in particular). In the embodiment illustrated, the distal ends of the arms 16 have respective arcuate notches or recesses 19 for coupling with the lateral surfaces of the appendages 13.

After the revolving rollers 17 have been disengaged from the associated guides 18, the final translation of the capsule-carrying assembly 6 is controlled directly by the arms 16 which are coupled with the appendages 13. The translation of the capsule-carrying assembly 6 ends when, as a result of a further rotation of the shaft 14, the condition shown in FIG. 7 is reached, in which the cup-shaped portion 8 of the body 7 is coupled with the dispensing head 5 (with the interposition of a capsule 2) to define therewith an infusion or percolation chamber for the preparation of the beverage.

Upon completion of the preparation of the beverage, the user can return the machine 1 to the initial condition of FIG. 4 by rotating the shaft 14 in reverse.

Whilst the capsule-carrying assembly 6 is being moved from the working position of FIG. 7 to the intermediate position of FIG. 5 the revolving rollers 17 thus re-engage in the associated guides 18 at a predetermined moment. After the intermediate position shown in FIG. 5 has been reached, further rotation (anticlockwise as seen in that drawing) of the shaft 14 brings about rotation of the capsule-carrying assembly 6 about the horizontal axis B-B defined by the pins 9 which are once again engaged in the lower ends of the associated slots 10. The capsule-carrying assembly 6 thus returns to the loading position (FIG. 4).

As an alternative to the manually operated version described above, the machine according to the invention may be constructed in a motorized embodiment. For this purpose, a reversible electric motor of known type is connected to the above-described shaft 14, optionally by means of a speed reducer. Microswitch devices of known type may then advantageously be associated with the motor in order to interrupt its power supply when the capsule-carrying assembly 6 reaches the travel-limit positions.

The operation of the motorized variant is similar to that described above with reference to the manually operated machine.

The machine 1 according to the invention may advantageously be provided with a system for ejecting the used capsule 2 from the cup-shaped portion 8 of the capsule-carrying assembly 6 after the dispensing of a beverage. This system is, for example, of the type described in detail in European patent application EP 1 854 384 A1 cited above and will not therefore be described further.

FIGS. 8 to 12 show a variant of the machine described above.

In these drawings, parts and elements corresponding to parts and elements that have already been described have again been attributed the same reference numerals as were used above.

The version according to FIGS. 8 to 12 differs from that described above substantially in that the actuating assembly now comprises two toggle-jointed arms instead of a pair of simple, rigid arms. The jointed arms are generally indicated 16 and each comprises a rigid arm 16a having one end fixed to the shaft 14 and the other end articulated to a second arm 16b at 20. The distal end of the second arm 16b is provided with the arcuate recess or notch 19 for coupling with the transversely projecting appendage 13 of the body 7 of the capsule-carrying assembly.

Figures 9, 10:
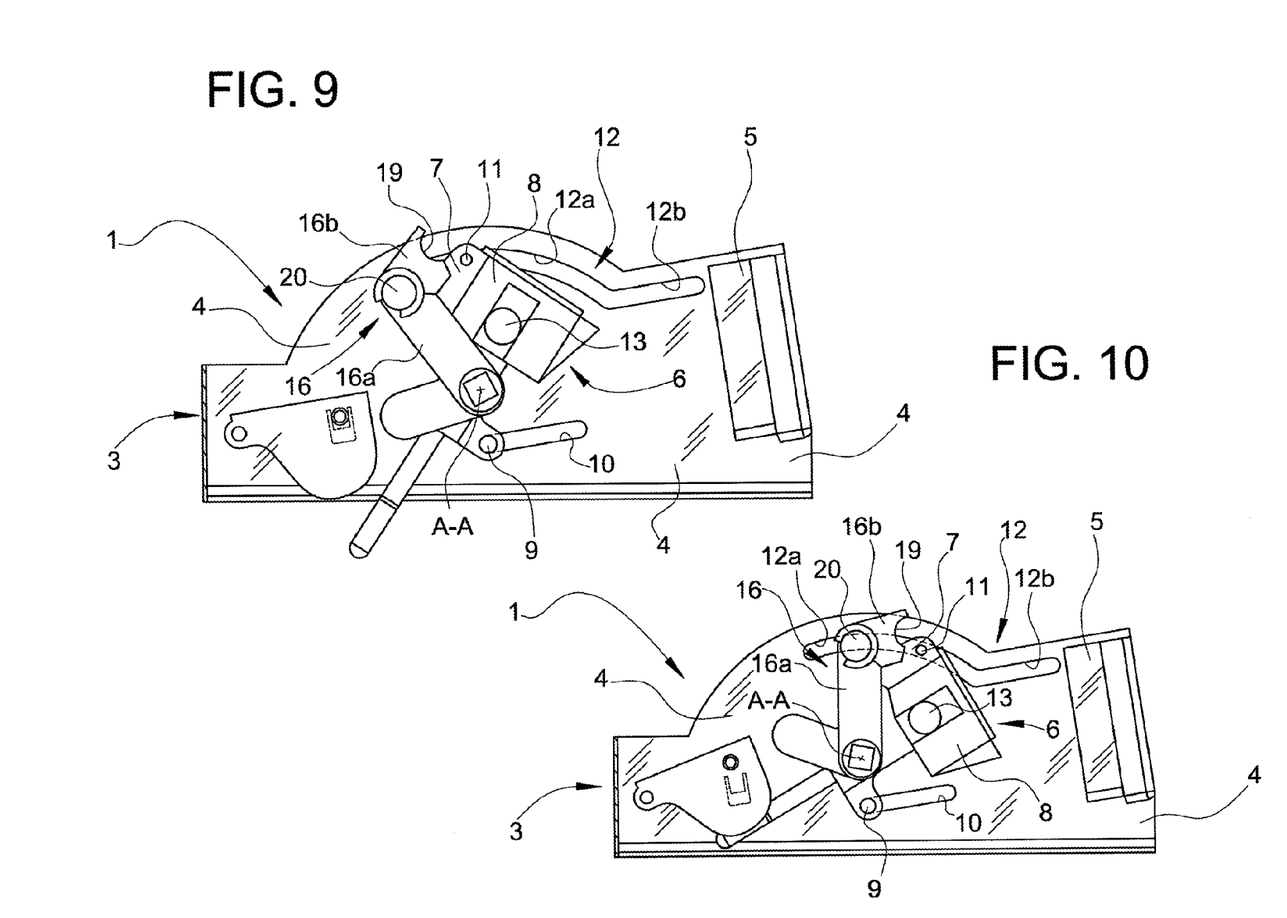
FIGS. 9 to 12 are partial side views which show the machine of FIG. 8 in four different operative conditions.
Figures 11, 12:
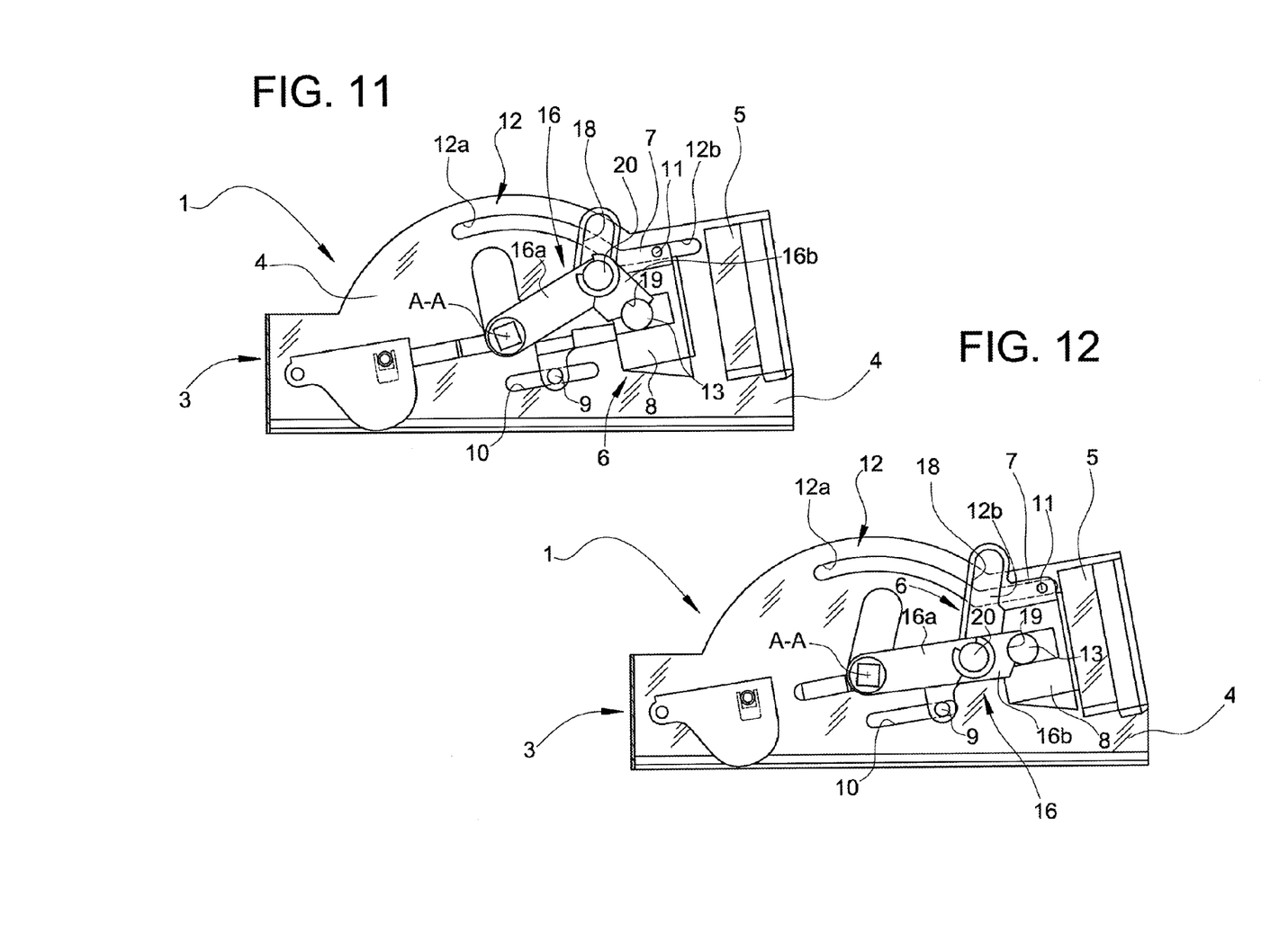

A torsion spring associated with the articulation 20 of each toggle-jointed arm 16 tends to keep it in the folded condition shown in FIGS. 9 to 11 with the two arms 16a and 16b in abutment with one another along respective axes which are inclined at a predetermined angle to one another.

The operation of the variant of FIGS. 8 to 12 is similar to that of the machine described above with reference to FIGS. 1 to 7: during the movement from the loading position (FIG. 9) to the position in which the revolving rollers 17 disengage from the associated guides 18 (FIG. 11), the toggle-jointed arms 16 remain in the folded condition.

Starting from the position shown in FIG. 11 and until the working position is reached, the toggle-jointed arms 16 engage the corresponding appendages 13 of the capsule-carrying assembly with the respective end arms 16b and, against the action of the associated torsion springs, open out progressively until they reach the alignment condition (FIGS. 8 and 12) upon reaching the working position in which the cup-shaped portion 8 of the capsule-carrying assembly forms the leaktight coupling with the dispensing head 5.

The use of the toggle-jointed arms 16 advantageously ensures greater planarity in the coupling between the capsule-carrying assembly 6 and the associated dispensing head 5 in the working or dispensing position.

Otherwise, the operation of the machine of FIGS. 8 to 12 corresponds to that of the machine described above and will not therefore be repeated here.

Naturally, the principle of the invention remaining the same, the forms of embodiment and details of construction may be varied widely with respect to those described and illustrated purely by way of non-limiting example, without thereby departing from the scope of the invention as defined in the appended claims.

The invention claimed is:

1. A machine (1) for preparing beverages by infusion of a product contained in a capsule (2), comprising
   a support structure (3) carrying a hot-water dispensing head (5),
   a capsule-carrying assembly (6), mounted so as to be movable in a first plane in the support structure (3),
   guide means (9-12) suitable for allowing the capsule-carrying assembly (6) to move between a working position in which said assembly is coupled with the dispensing head (5) and an intermediate position in which said assembly (6) can pivot about a first axis (B-B) perpendicular to said first plane, towards an angular loading position in which it can receive a capsule (2), and
   actuating means (14-19) including:
   an actuator member (14) which is rotatable about a second fixed axis (A-A) parallel to said first axis (B-B), is coupled with the capsule-carrying assembly (6), and can bring about the movement thereof between the working position and the loading position; and at least one arm (16) which is controlled by the actuator member (14) and is provided with a revolving roller (17) which is engaged in a corresponding rolling guide (18) of the capsule-carrying assembly (6), and which is arranged in a second plane parallel to said first plane;

the arrangement being such that, when the capsule-carrying assembly (6) is situated between the loading position and said intermediate position, the movement of said assembly (6) is controlled by means of the revolving roller (17) of said at least one arm (16) and the corresponding guide (18) and, when the capsule-carrying assembly (6) is in a position between said intermediate position and the working position, the revolving roller (17) of said at least one arm (16) can disengage from the corresponding guide (18) and said at least one arm (16) is coupled directly with the capsule-carrying assembly (6) so that the capsule-carrying assembly (6) can be urged towards and against the dispensing head (5) directly by said at least one arm (16).

2. The machine according to claim 1, wherein said at least one arm (16) is in one piece.

3. The machine according to claim 1, wherein said at least one arm (16) is a toggle-jointed arm and comprises a first arm (16a) which is fixed to said rotatable actuator member (14) and a second arm (16b) which is articulated to said first arm (16a) and is intended to interact with the capsule-carrying assembly (6) when the latter is in the vicinity of the dispensing head (5).

4. The machine according to claim 3 wherein resilient means are interposed between said first arm (16a) and said second arm (16b) and tend to keep said at least one toggle-jointed arm (16) in a folded configuration as long as the associated revolving roller (17) is engaged in the corresponding guide (18).

5. The machine according to any one of the preceding claims, wherein the distal end portion of said at least one arm (16) has an arcuate seat (19) suitable for coupling with a corresponding appendage (13) of the capsule-carrying assembly (6).

* * * * *